(12) United States Patent
Wakamori

(10) Patent No.: US 7,151,488 B2
(45) Date of Patent: Dec. 19, 2006

(54) MOBILE DEVICE

(75) Inventor: Mikio Wakamori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/065,879

(22) Filed: Feb. 24, 2005

(65) Prior Publication Data

US 2005/0242988 A1 Nov. 3, 2005

(30) Foreign Application Priority Data

Mar. 5, 2004 (JP) .......................... P2004-062370

(51) Int. Cl.
*G01S 5/14* (2006.01)
(52) U.S. Cl. .............................. 342/357.1; 342/357.06; 342/357.09
(58) Field of Classification Search ........... 342/357.06, 342/357.09, 357.1; 455/3.06, 556.1, 556.2, 455/344–346, 99; 381/86
See application file for complete search history.

(56) References Cited

U.S. PATENT DOCUMENTS

| | | | |
|---|---|---|---|
| 6,182,010 B1* | 1/2001 | Berstis .................. | 342/357.06 |
| 6,417,786 B1* | 7/2002 | Learman et al. ........... | 701/213 |
| 6,448,927 B1* | 9/2002 | Ishigaki et al. ......... | 342/357.06 |
| 6,452,544 B1* | 9/2002 | Hakala et al. ......... | 342/357.06 |
| 6,480,149 B1* | 11/2002 | Sutherland et al. ...... | 342/357.1 |
| 6,693,586 B1* | 2/2004 | Walters et al. ......... | 342/357.06 |
| 2002/0116082 A1* | 8/2002 | Gudorf ....................... | 709/217 |
| 2002/0169547 A1* | 11/2002 | Harada ....................... | 701/211 |
| 2004/0021601 A1* | 2/2004 | Farmer .................. | 342/357.06 |

FOREIGN PATENT DOCUMENTS

| | | |
|---|---|---|
| JP | 9-139691 | 5/1997 |
| JP | 2000-337889 | 12/2000 |
| JP | 2001-176254 | 6/2001 |
| JP | 2002-507734 | 3/2002 |
| JP | 2002-101183 | 4/2002 |
| JP | 2004-48734 | 2/2004 |

* cited by examiner

*Primary Examiner*—Thomas H. Tarcza
*Assistant Examiner*—Fred H. Mull
(74) *Attorney, Agent, or Firm*—Bell, Boyd & Lloyd LLC

(57) ABSTRACT

A mobile device is provided. The mobile device provides simple connection with a mobile device unit, resistant to noise from the mobile device unit, and enabling a GPS function to be fully exhibited, wherein a first integrated circuit IC21 mounting a GPS receiver and GPS antenna and a second integrated circuit IC22 mounting a controller control circuit are housed in a controller unit, the controller unit is provided with a headphone jack and a music/speech terminal-GPS terminal to be connected to the mobile device unit, and the terminal is inserted into the mobile device unit to supply power source voltage from the mobile device unit side and enable the controller and GPS function to be used.

9 Claims, 6 Drawing Sheets

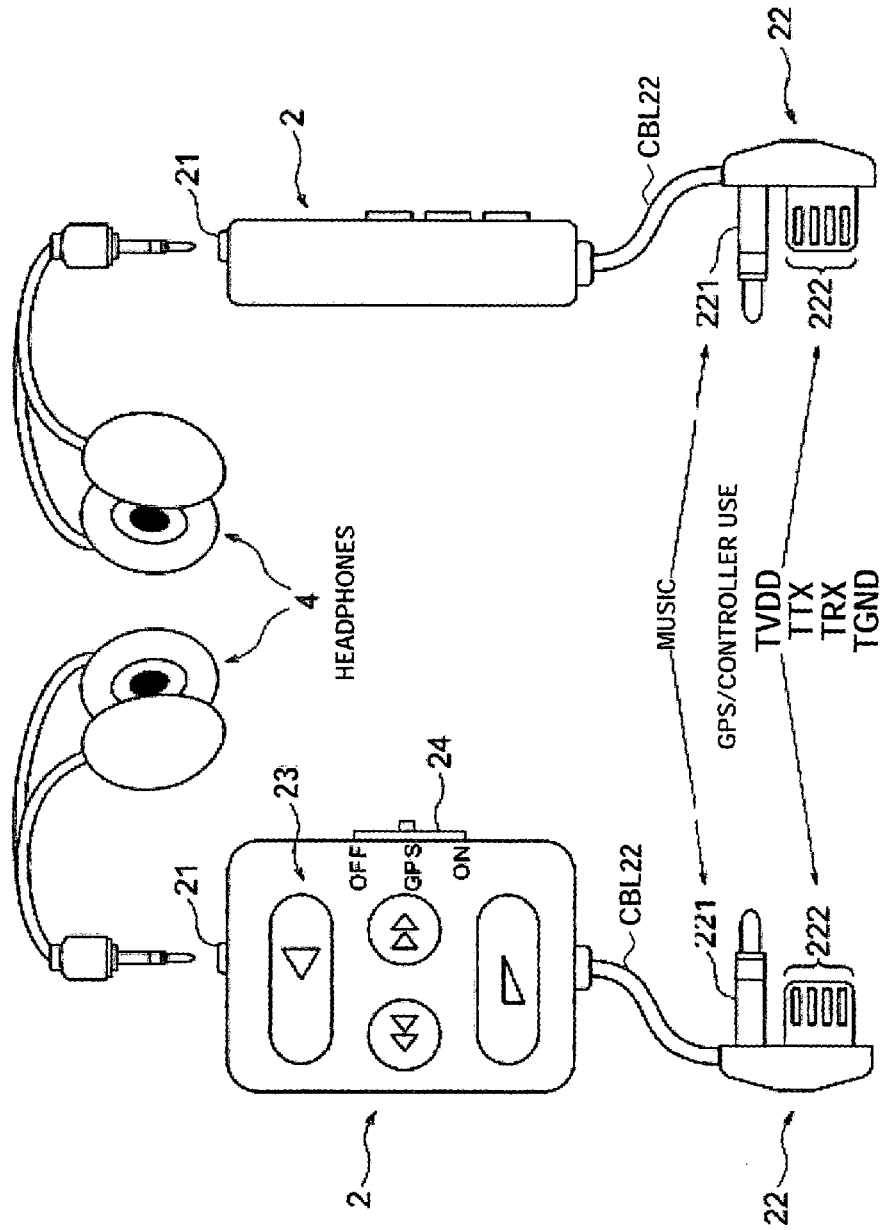

MOBILE DEVICE

CROSS REFERENCE TO RELATED APPLICATIONS

The present application claims priority to Japanese Patent Application No. 2004-062370 filed on Mar. 5, 2004, the entire disclosure of which is incorporated herein by reference.

BACKGROUND OF THE INVENTION

The present invention relates to a mobile device such as a mobile information terminal equipped with a global positioning system (GPS) function.

GPS systems for receiving a radio wave from a satellite and finding the current position of a moving object are being mounted in mobile phones, personal digital assistants (PDA's), and other mobile devices.

Such mobile devices have GPS receivers built in the mobile device units, utilize memory cards or other interfaces, or utilize USB, BlueTooth, or other various interfaces to provide position information to the mobile device units.

GPS receivers utilizing memory cards or other interfaces have built-in memory cards etc. and are used inserted into slots of the mobile device units. Mobile devices utilizing USB's are connected to GPS receivers with built-in USB's by USB cables to provide position information to the units. Mobile devices utilizing radio waves BlueTooth utilize BlueTooth to provide position information.

The above related art suffers from several problems. Mobile devices with GPS receivers built into the mobile device units or utilizing memory cards or other interfaces suffer from the problem that the GPS receivers are susceptible to noise from the mobile device units due to their proximity to the units, so sometimes the performance of the GPS receivers, specifically the sensitivity, position accuracy, or position-finding time, is not sufficient.

Further, mobile devices utilizing memory cards or other interfaces end up with their slots occupied when using the GPS function, so their slots cannot be used for other applications.

In mobile devices utilizing BlueTooth, the GPS receiver and BlueTooth device sides require batteries, so the devices become large in size. Further, when the batteries runs out, these functions can no longer be used. When using these interfaces, it is therefore necessary to mount these interfaces at the mobile device sides.

SUMMARY OF THE INVENTION

The present invention relates to a mobile device such as a mobile information terminal equipped with a global positioning system (GPS) function.

The present invention provides in an embodiment a mobile device which enables simple connection with the mobile device unit and which enables a GPS function to be sufficiently exhibited with little susceptibility to noise from the mobile device unit.

In an embodiment, the present invention provides a mobile device having a mobile device unit for performing predetermined processing in accordance with an operation from the outside and a remote controller unit for operating the mobile device unit from the outside, the mobile device unit including a power circuit able to supply drive power for the remote controller unit and a first control circuit for controlling processing in accordance with information of the operation from the outside, the remote controller unit including connecting means having at least an information line and a power line and able to connect to the mobile device unit, at least one operating means for operating the mobile device unit, a position-finding receiver receiving drive power through the connecting means from the mobile device unit and receiving a satellite signal to be able to obtain position-finding information, and a second control circuit providing at least position information corresponding to the position-finding information of the position-finding receiver through the connecting means to the first control circuit of the mobile device unit.

Preferably, the remote controller unit in an embodiment has a power line for transmitting power source voltage supplied through the connecting means and a signal line connected to an information line of the connecting means, and the operating means is connected between the power line and the signal line.

Alternatively, the remote controller unit in an embodiment has a power switch for turning the supplied power on/off at the line supplying the second control circuit and position-finding receiver with drive power supplied through the connecting means.

Alternatively, the second control circuit in an embodiment is able to control the mobile device unit through the connecting means regardless of whether the position-finding receiver is being used or not and provides position information through the connecting means to the first control circuit of the mobile device unit when the position-finding receiver is being used.

Preferably, the remote controller unit in an embodiment has a headphone jack, and the connecting means includes a music/speech terminal for supplying music/speech information to the headphone jack.

Alternatively, the connecting means in an embodiment includes a shared terminal for a control line of the mobile device unit and a transfer line of the position information of the second control circuit.

More preferably, the connecting means in an embodiment includes a first terminal including a control line of the mobile device unit and a music/speech line and second terminal including a transfer line of the position information of the second control circuit.

Alternatively, the remote controller unit in an embodiment has a display device, and the second control circuit controls the display of the display device.

Alternatively, the first control circuit of the mobile device unit can freely set an update time of position information at the second control circuit through the connecting means in an embodiment.

Alternatively, the first control circuit of the mobile device unit makes the second control circuit set the position-finding receiver in a sleep mode or an operating state through the connecting means in an embodiment.

Alternatively, the second control circuit sets the position-finding receiver to a sleep mode when no operating means is operated for a predetermined time and starts up the position-finding receiver when the operating means is operated in an embodiment.

According to an embodiment of the present invention, by inserting the terminal of the connecting means in the mobile device unit, drive power is supplied from the mobile device unit side to the controller unit and the controller and position-finding receiver can be used. The controller unit with the built-in position-finding receiver can be connected by for example a cable and is separated from the mobile device unit, so is resistant to noise from the mobile device unit.

Since almost all mobile devices are equipped with earphone jacks, it is possible to utilize the earphone jacks to connect to almost all mobile devices. The judgment of whether an operating means of the controller unit has been operated and/or operation of the display device are performed by the second control circuit side, so no special microcontroller is necessary. Further, the terminals for providing position information and the music/speech terminal are separate, so the position information can be provided while listening to music or speech. Also, since use as a controller is also possible, the mounting of a position-finding receiver will not impair the functions of the controller.

Additional features and advantages of the present invention are described in, and will be apparent from, the following Detailed Description of the Invention and the figures.

BRIEF DESCRIPTION OF THE FIGURES

FIGS. 2A and 2B are views of an example of a remote controller unit of a mobile device according to the first embodiment, wherein FIG. 2A is a front view and FIG. 2B is a side view;

DETAILED DESCRIPTION OF THE INVENTION

The present invention relates to a mobile device such as a mobile information terminal equipped with a global positioning system (GPS) function.

Preferred embodiments of the present invention will be described in detail below while referring to the attached figures.

Figure 1:
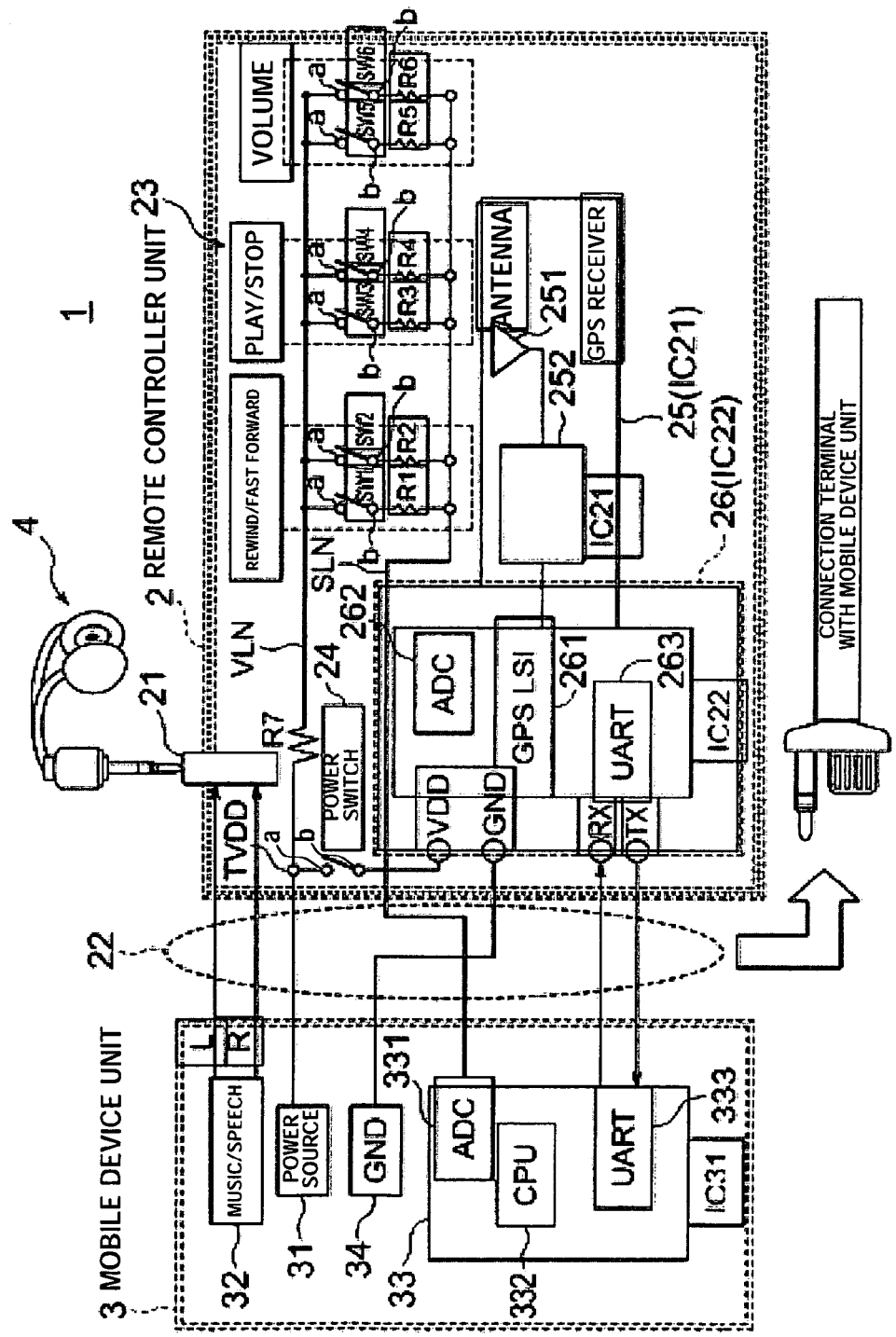
FIG. 1 is a view of the system configuration of a mobile device according to a first embodiment of the present invention.

FIG. 1 is a view of the system configuration of a mobile device according to an embodiment of the present invention. FIGS. 2A and 2B are views of the appearance of an example of a remote controller unit of a mobile device according to the first embodiment, wherein FIG. 2A is a front view and FIG. 2B is a side view.

The mobile device 1 has a remote controller unit 2 with a built-in GPS receiver (hereinafter referred to as a "controller unit"), a mobile device unit 3, and headphones 4 as main components. In this embodiment, the power source voltage VDD of the controller unit 2 is supplied from the mobile device unit 3. That is, the controller unit 2 is designed not provided with a power circuit.

The controller unit 2 is provided with a headphone jack 21, a mobile device connection terminal 22 serving as connecting means for connecting to the mobile device unit 3, a control key group 23 serving as operating means for operating the mobile device unit 3, a GPS receiver power switch 24, a GPS receiver 25, and a control circuit for controlling the GPS receiver 25 and the mobile device unit 3 (second control circuit) 26.

Further, the headphone jack 21 is arranged at the top of the unit, the mobile device connection terminal 22 is connected to the bottom of the unit by a cable CBL22, the control key group 23 for operating the mobile device unit 3 is arranged at the front of the unit, and the GPS receiver power switch 24 is arranged at the side. The controller unit 2 houses inside it a first integrated circuit IC21 mounting the GPS receiver 25 and a second integrated circuit IC22 mounting the control circuit for a controller.

Figures 3A, 3B:
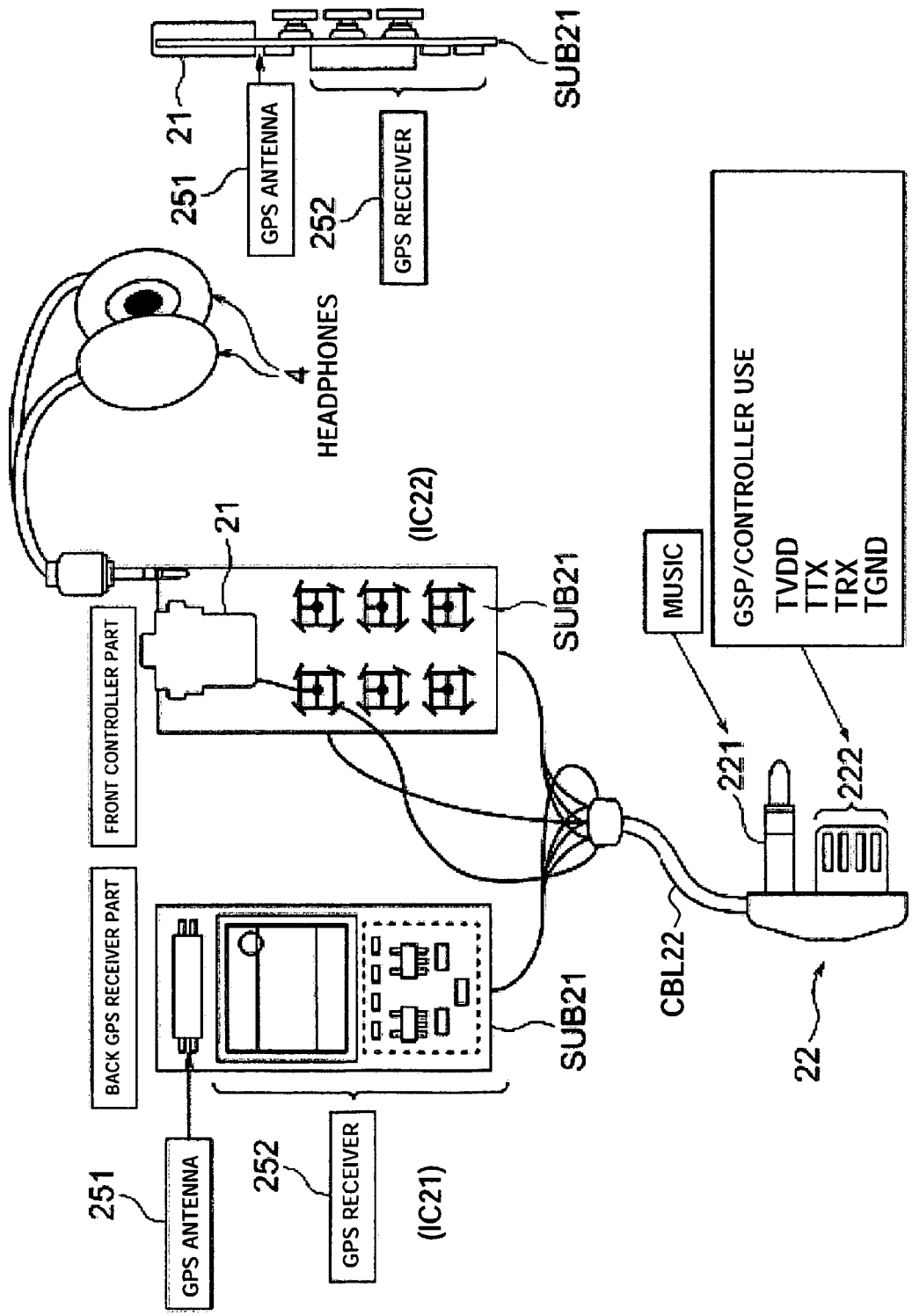
FIGS. 3A and 3B illustrate forming a first integrated circuit mounting a GPS receiver and a GPS antenna and a second integrated circuit mounting a control circuit for a controller on the front and back of a single board and housing the board in the controller unit.

Note that the first integrated circuit IC21 and second integrated circuit IC22, as shown in for example FIGS. 3A and 3B, can be formed on a single circuit board SUB21 with the first integrated circuit IC21 formed on the back surface and the second integrated circuit IC22 formed on the front surface. In the example of FIGS. 3A and 3B, the headphone jack 21 is formed at one side of the circuit board SUB21 and is connected to the control circuit 26 of the second integrated circuit IC22.

The mobile device connection terminal 22 has a stereo music/speech terminal 221 for supplying stereo music/speech to the headphone jack 21 and a controller terminal 222. The controller terminal 222 serves as both the GPS receiver terminal and mobile device controller terminal. The controller terminal 222 is comprised of a power terminal TVDD for supplying power source voltage VDD from the mobile device unit 3 to the inside of the controller unit 2, a ground terminal TGND, a transmission terminal TTX for transferring information from the control circuit 26 to the mobile device unit 3, and a reception terminal TRX for inputting information from the mobile device to the control circuit 26 arranged in parallel. The thus configured mobile device connection terminal 22 is designed to enable connection to a predetermined connection terminal of a not shown mobile device unit 3.

The control key group 23 has, for example, a rewind switch SW1, fast forward switch SW2, play switch SW3, stop switch SW4, and volume switches SW5 and SW6. The terminals a of the switches SW1 to SW6 are connected to a power line VLN connected to the power terminal TVDD, while the terminals b are connected through different resistance value resistors R1 to R6 to a signal line SLN. Further, between the connection part of the power line VLN with the power terminal TVDD and the terminal a of the switch SW1 is connected a resistor R7. The signal line SLN is connected to the control circuit 26. When the switches SW1 to SW6 are operated (for example, when depressed), the switches SW1 to SW6 output different value voltage signals through the resistors R1 to R6.

The power switch 24 is an on/off switch. Its terminal a is connected to the power terminal TVDD, while its terminal b is connected to the power terminal of the control circuit 26. When the mobile device connection terminal 22 is connected to the mobile device unit 3 and the mobile device unit 3 is in the on state, if the power switch 24 is turned on, the control circuit 26 including the GPS baseband part and the GPS receiver 25 are supplied with drive power.

The GPS receiver 25 has a GPS antenna 251 and a GPS front end part 252 for performing predetermined processing on the GPS RF signal. The GPS receiver 25 is supplied with drive power when the power switch 24 is in the on state.

The GPS antenna 251 receives a for example frequency 1575.42 MHz wireless RF signal having a predetermined format from the GPS satellite and supplies it to the GPS front end part 252.

The GPS front end part 252 includes for example a not shown low noise amplifier (LNA), a band pass filter (BPF) comprised of a SAW filter, an amplifier, a frequency synthesizer, a mixer, an amplifier, a low pass filter (LPF), and an analog/digital converter (ADC). The thus configured GPS front end part 252 amplifies an RF signal received by the GPS antenna 251 by the low noise amplifier, removes the parts of the signal other than the GPS signal band by the BPF, and inputs the remainder to the mixer through the amplifier. Further, the mixer mixes this with a for example frequency 1574.397 MHz signal from a frequency synthesizer and passes the result through the amplifier and LPF to extract a for example frequency 1.023 MHz intermediate frequency signal (IF signal). The extracted IF signal is converted by the ADC to a digital signal and output as a serial signal IF signal to the GPS circuit (GPS baseband part) of the control circuit 26.

The control circuit 26 functions as a controller able to operate the mobile device unit 3 regardless of whether the GPS receiver 25 is being used or not. When the GPS receiver 25 is being used, it provides the position information from the GPS receiver terminal TTX to the mobile device unit 3. The control circuit 26 includes a GPS circuit (GPS-LSI) 261 including a GPS baseband part. This GPS circuit 261 includes built in it a CPU and an analog/digital converter (ADC) 262. It judges based on the voltage signal input through the signal line SLN which keyswitch key of the control key group 23 has been operated and transmits this information to the CPU of the mobile device unit 3 through a UART 263 (universal asynchronous receiver/transmitter).

The GPS baseband part of the control circuit 26 receives the IF signal from the GPS front end part 251 of the GPS receiver 25 based on the system clock. At the start or when the system is considerably off in synchronization, it performs acquisition for finding the synchronization point and performs tracking for controlling the delay to one sufficiently smaller than one chip length of the spread code after acquisition and obtaining the C/A (coarse acquisition or clear and acquisition) code and carrier synchronization. Further, it performs processing for finding the position, searching for a position, etc. by the range data, amount of doppler shift, navigation message, time, etc.

The mobile device unit 3 has a power circuit 31, a music/speech reproduction circuit 32 for performing processing for reproducing music/speech from for example a CD or MD, a control circuit (first control circuit) 33, and a ground terminal (GND) 34 as main components.

The power circuit 31 supplies the different parts of the mobile device unit 3 with drive power. Further, it supplies the controller unit 2 connected through the mobile device connection terminal 22 with drive power for the control circuit and GPS receiver. The music/speech reproduction circuit 32 performs processing for reproducing music/speech from for example a CD or MD under the control of the control circuit 33.

The control circuit 33 has an ADC 331, CPU 332, and UART 333. The control circuit 33 is connected through the mobile device connection terminal 22 to the UART 263 of the control circuit 26 of the controller unit 2 by the TART 333. The information of the keyswitches SW1 to SW6, the position information from the GPS, and commands are transferred between the control circuit 33 and the control circuit 26 of the controller unit 2 through the UART. When the keyswitches SW1 to SW6 of the controller unit 2 are operated, the voltages from the keys are completely different in value since the resistance values differ. The ADC 331 receives the voltage values through the mobile device connection terminal 22, converts them to digital signals, and outputs them to the CPU 332. The CPU 332 reads the output value of the ADC 331 to judge which of the keyswitches SW1 to SW6 of the controller unit 2 has been operated and controls the mobile device unit 3. Further, for example, usually, the position information output from the GPS receiver is updated every second, but the CPU 332 may set any update time by a command.

Next, the operation according to the above configuration will be explained.

When the mobile device connection terminal 22 to the mobile device unit 3 provided at the controller unit 2 is connected to a predetermined connection terminal of the mobile device unit 3, the power source voltage VDD of the power circuit 31 of the mobile device unit 3 is supplied to the power terminal TVDD and power line VLN of the controller unit 2 and can be used by the controller unit 2.

Here, when any of the keyswitches SW1 to SW6 provided at the controller unit 2 is operated, the voltage signal from the corresponding one of the keyswitches SW1 to SW6 is output. Completely different voltage values are output since the resistances of the resistors R1 to R6 connected with the signal line SLN differ. This voltage signal passes through the signal line SLN and the control circuit 26 and further passes through the mobile device connection terminal 22 to be input to the ADC 331 mounted at the control circuit 33 of the mobile device unit 3. The voltage output of the ADC 331 is read by the CPU 332. Due to this, the CPU 332 judges which keyswitch has been operated and based on the results of judgment controls a predetermined functional circuit of the mobile device unit 2.

Further, when the power switch 24 of the controller unit 2 is turned to the on position, the control circuit 26 and GPS receiver 25 are supplied with power source voltage VDD, whereby the GPS function starts to operate. Further, the wireless RF signal having a predetermined format is received at the GPS antenna 251 and supplied to the GPS front end part 252. The GPS front end part 252 amplifies the RF signal received at the GPS antenna 251 by the low noise amplifier and removes the parts of the signal other than the GPS signal band by the BPF. After a predetermined amplification action, the RF signal is mixed in the mixer with a signal from a frequency synthesizer. The result is passed through the amplifier and LPF whereby the IF signal is extracted. The extracted IF signal is converted by the ADC to a digital signal which is then supplied to the GPS baseband part of the GPS circuit 261 of the control circuit 26.

The GPS baseband part of the GPS circuit 261 receives the IF signal from the GPS front end part 251 of the GPS receiver 25 and performs acquisition and tracking. Further, it performs processing to find the position, search for a position, etc. based on the range data, amount of doppler shift, navigation message, time, etc. Further, the control circuit 26 outputs the position information from the UART 263 of the GPS circuit 261 through the mobile device connection terminal 22 to the control circuit 33 of the mobile device unit 3. Note that usually the position information output from the GPS receiver is updated every second, but any update time can be set by a command from the CPU 331 of the mobile device unit 3 and the position information output from the GPS receiver at that set update time. Further, even without turning the power switch 24 of the GPS receiver to the off position, a command from the CPU 331 of the mobile device unit 3 may be used to place the GPS receiver in a sleep mode and later turn it back on so as to reduce the power consumption. Even if the keyswitches SW1 to SW6 of the controller unit 2 are operated while the GPS receiver is in the operating state, the signal lines SLN are different between the transfer operation of the GPS receiver and the operation of the keyswitches SW1 to SW6, so the operating signals of the keyswitches SW1 to SW6 can be received.

As explained above, according to an embodiment, since the first integrated circuit IC22 mounting the GPS receiver and GPS antenna and the second integrated circuit IC22 mounting the controller control circuit are housed in the controller unit 2, the controller unit 2 is provided with a music/speech terminal to be connected to a headphone jack 21 and mobile device and a GPS terminal 22, and the terminal 22 is inserted into the mobile device unit 3 to supply power source voltage VDD from the mobile device unit 3 side and enable use of the controller and GPS function, there are the following advantageous effects.

That is, the controller with the built-in GPS receiver is connected by a cable and separated from the mobile device unit 3, so is resistant to noise from the unit. Further, almost all mobile devices are equipped with earphone jacks, so it is possible to utilize the earphone jacks to connect to almost all mobile devices. Further, which of the keyswitches SW1 to SW6 of the controller unit 2 has been operated is judged by the GPS circuit 261 side, so no specialized microcontroller is necessary. The terminal for providing the GPS position information and the music/speech terminal are separate, so position information can be provided while listening to music or speech. Further, use as a controller is also possible, so the mounting of the GPS device does not impair the functions of the controller.

Figure 4:
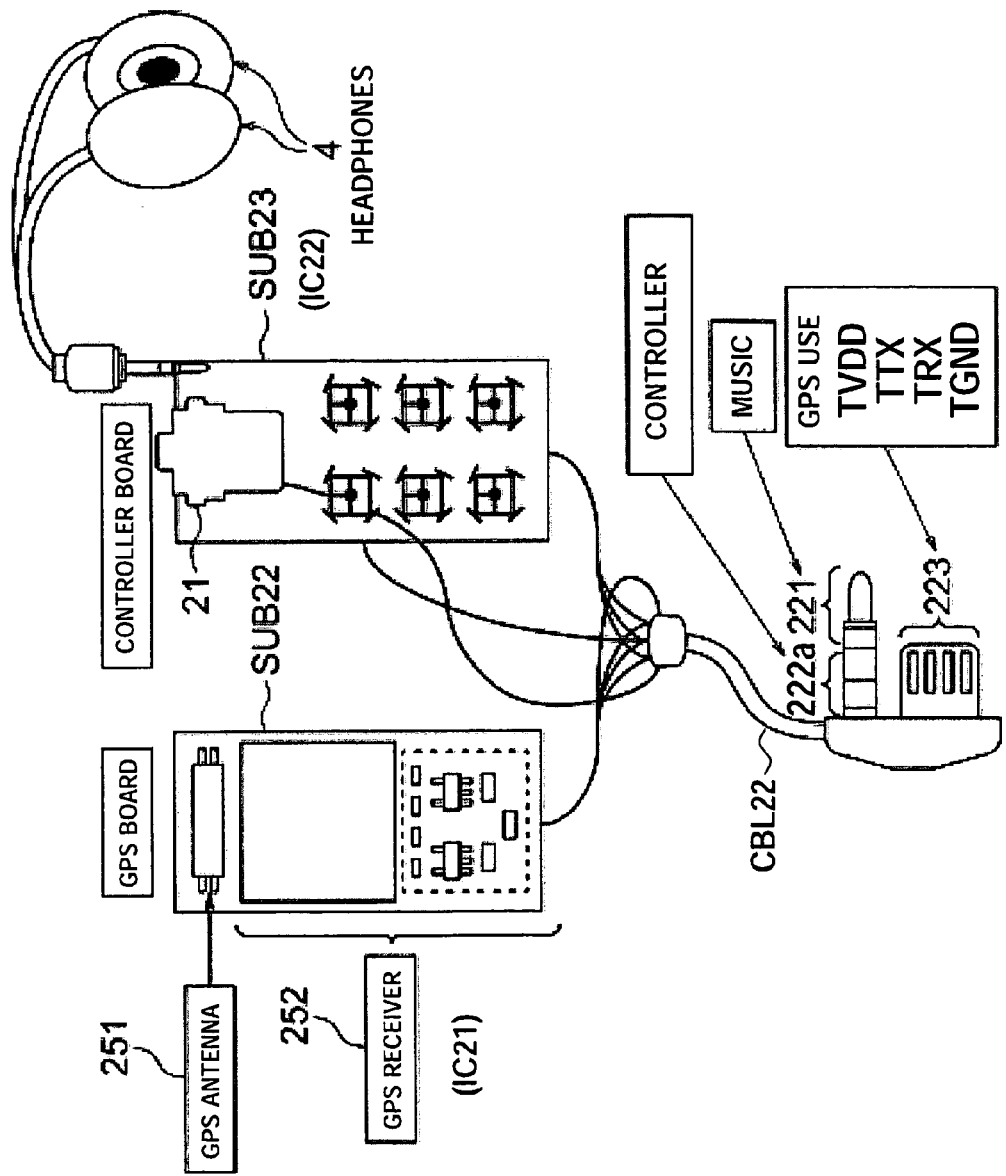
FIG. 4 is a view of an example of separate provision of a first circuit board formed with a first integrated circuit mounting a GPS receiver and a GPS antenna and a second circuit board formed with a second integrated circuit mounting a control circuit for a controller and housing the boards in the controller unit.

Note that in an embodiment, the example of forming the first integrated circuit IC21 mounting the GPS receiver and GPS antenna and the second integrated circuit IC22 mounting the control circuit for the controller on the front and back surfaces of a single circuit board SUB21 and housing this in the controller unit was explained, but for example as shown in FIG. 4, it is also possible to provide a first circuit board SUB 22 formed with the first integrated circuit IC21 mounting the GPS receiver and GPS antenna and a second circuit board SUB23 formed with the second integrated circuit IC22 mounting the control circuit for the controller separately.

Further, in an embodiment, in the mobile device connection terminal 22, the example of the controller terminal 222 being shared for the GPS receiver terminal and mobile device controller terminal was explained, but for example as shown in FIG. 4, it is also possible to form the controller terminal 222*a* and stereo music/speech terminal 221 by a single shared jack type terminal (first terminal) and provide a GPS control terminal (second terminal) 223 separately. In this case as well, the GPS control terminal 223 is comprised of a power terminal TVDD for supplying power source voltage VDD from the mobile device unit 3 to the inside of the controller unit 2, a ground terminal TGND, a transmission terminal TTX for transferring information from the control circuit 26 to the mobile device unit 3, and a reception terminal TRX for inputting information from a mobile device to the control circuit 26 arranged in parallel.

Further, in an embodiment, the example of provision of the power switch 24 at the controller unit 2 was explained, but for example this does not necessarily have to be provided so long as the power of the mobile device unit 3 can be turned on and off.

Figure 5:
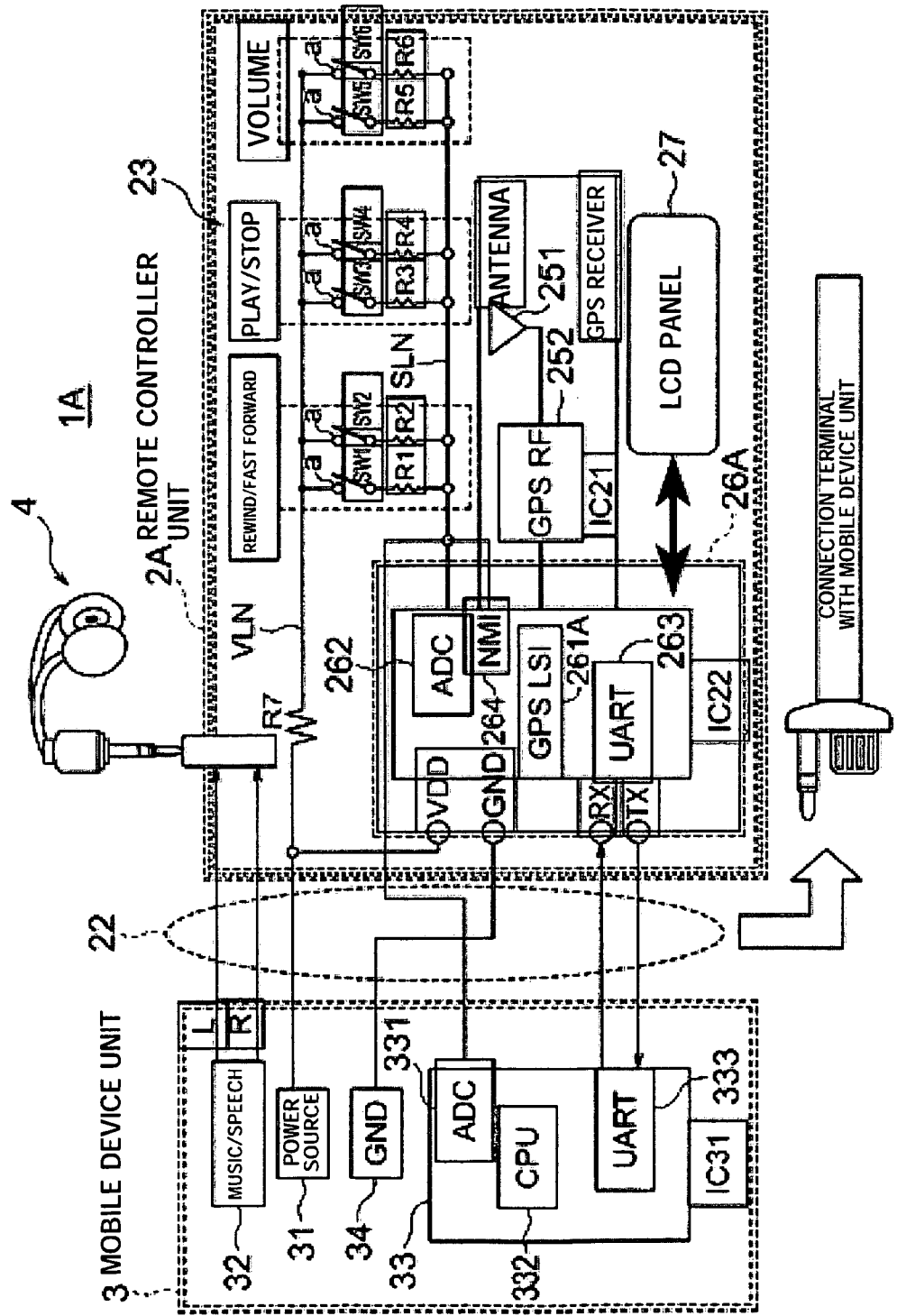
FIG. 5 is a view of the system configuration of a mobile device according to a second embodiment of the present invention.
Figure 6:
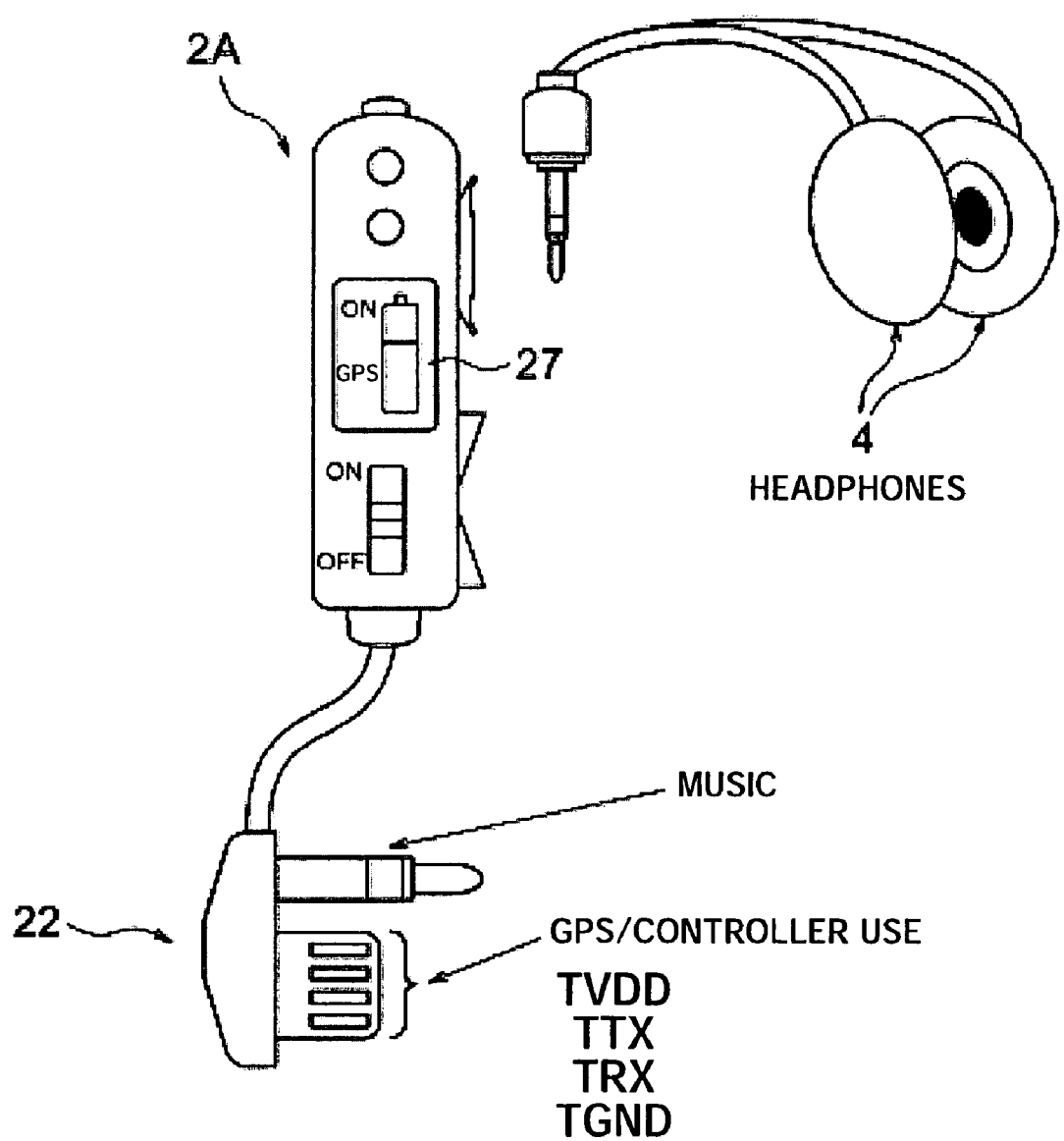
FIG. 6 is a view of the appearance of an example of a remote controller unit of a mobile device according to a second embodiment.

FIG. 5 is a view of the system configuration of a mobile device according to an embodiment of the present invention, where FIG. 6 is a view of the appearance of an example of a remote controller unit of a mobile device according to an embodiment.

The mobile device 1A according to an embodiment differs from the mobile device 1 according to an embodiment, as described above in the point that the controller unit 2A is for example provided with a liquid crystal display panel (LCD panel) 27.

In an embodiment, the LCD panel 27 is connected to the GPS circuit 261A of the control circuit 26A. The GPS circuit 261A controls the display of the LCD panel 27.

In this way, in the case of a controller unit 2A having an LCD panel 27, the operating information of the keyswitches SW1 to SW6 of the controller unit 2A is input to both of the ADC 331 of the control circuit 33 of the mobile device unit 3 and the ADC 262 of the control circuit 26A of the controller unit 2A. The LCD panel 27 is connected to the GPS circuit 261A. As explained above, the LCD is controlled in display by the GPS circuit 261A. The CPU 332 of the mobile device unit 3 controls the mobile device unit 3 based on the operating information of the keyswitches of the controller unit 2A. On the other hand, the control circuit 26A (GPS circuit) of the controller unit 2A also receives the keyswitch operating information, but the GPS circuit 261A does not control the operation of the mobile device unit 3, but displays the keyswitch operating information on the LCD panel 27.

Further, the controller unit 2A having the LCD panel 27 does not have a power switch for turning the GPS on/off, so when the connection terminal 22 to the mobile device unit 3 of the controller unit 2A is inserted into the mobile device unit, the GPS receiver is automatically supplied with power from the power source. When the power from the power source starts to be supplied, the GPS function does not operate. The controller unit 2A controls for display of the LCD panel 27 and the content of any of the keyswitches operated is judged. At this time, the GPS baseband circuit with the GPS function of the GPS circuit 261A is turned off by the built-in CPU so as to reduce power consumption. When no keyswitch is operated for a certain period (for example, 1 minute or more), the GPS receiver automatically enters the sleep mode so as to keep down the power consumption. When starting up the GPS receiver in the sleep mode, since the keyswitch operating information is also connected to the NMI 264 of the GPS circuit 261A of the GPS receiver, automatic startup is achieved by operation of any keyswitch. Further, startup is possible by a command from the CPU 332 of the mobile device unit 3.

The rest of the basic operation is the same as that of a controller unit not having an LCD.

According to an embodiment, effects similar to the effects of the first embodiment can be obtained.

Summarizing the effects of the invention, according to an embodiment of the present invention, there are the advantages that connection with a mobile device unit can be simplified and resistance to noise from the mobile device unit can be improved. Further, since a headphone jack equipped at the mobile device is used, connection to almost all mobile devices becomes possible.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A mobile device comprising:
a mobile device unit for performing processing in accordance with an operation from outside said mobile device, and
a remote controller unit for operating said mobile device unit from outside said mobile device,
said mobile device unit including
a power circuit capable of supplying drive power for said remote controller unit and
a first control circuit for controlling processing in accordance with information of said operation from outside said mobile device,
said remote controller unit including
a connecting means having at least an information line and a power line and capable of remotely connecting the remote controller unit to said mobile device unit through a connection cable,
at least one operating means for operating said mobile device unit,
a position-finding receiver receiving drive power through said connecting means from said mobile device unit and receiving a satellite signal capable of obtaining position-finding information,
a second control circuit providing at least position information corresponding to the position-finding information of said position-finding receiver through said connecting means to said first control circuit of said mobile device unit, and
a headphone jack,
wherein said connecting means includes a first terminal including a control line of said mobile device unit and a music/speech line and a second terminal including a transfer line of said position information of said second control circuit.

2. A mobile device as set forth in claim 1, wherein said remote controller unit comprises a power line for transmitting power voltage supplied through said connecting means and a signal line connected to an information line of said connecting means, and
said operating means is connected between said power line and said signal line.

3. A mobile device as set forth in claim 1, wherein said remote controller unit comprises a power switch for turning said supplied power on or off at a line supplying the second control circuit and position-finding receiver with drive power supplied through said connecting means.

4. A mobile device as set forth in claim 3, wherein the first control circuit of said mobile device unit controls said second control circuit to set said position-finding receiver in a sleep mode or an operating state through said connecting means.

5. A mobile device as set forth in claim 1, wherein said second control circuit is capable of controlling said mobile device unit through said connecting means where said position-finding receiver is optionally used and provides position information through said connecting means to said first control circuit of said mobile device unit when said position-finding receiver is being used.

6. A mobile device as set forth in claim 1, wherein
said remote controller unit comprises a display device, and
said second control circuit controls the display of said display device.

7. A mobile device as set forth in claim 1, wherein the first control circuit of said mobile device unit is capable of setting an update time of position information at said second control circuit through said connecting means.

8. A mobile device as set forth in claim 1, wherein the first control circuit of said mobile device unit controls said second control circuit to set said position-finding receiver in a sleep mode or an operating state through said connecting means.

9. A mobile device as set forth in claim 1, wherein said second control circuit sets said position-finding receiver to a sleep mode when no operating means is operated for a predetermined time and starts up said position-finding receiver when the operating means is operated.

* * * * *